Aug. 7, 1945.  C. J. FECHHEIMER  2,381,122
COOLING MEANS FOR DYNAMO-ELECTRIC MACHINES
Filed April 27, 1944
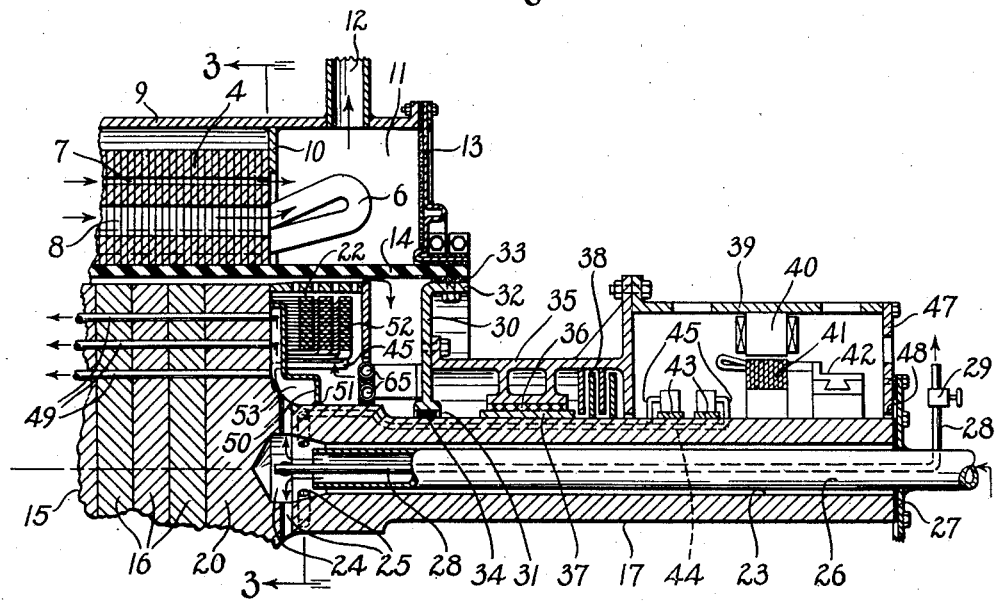
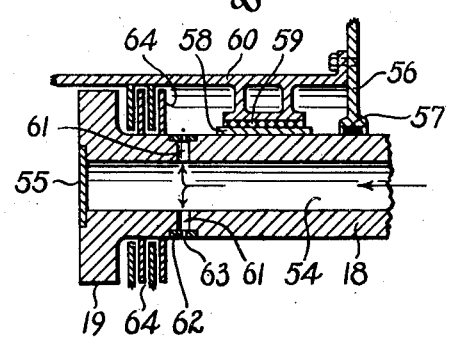
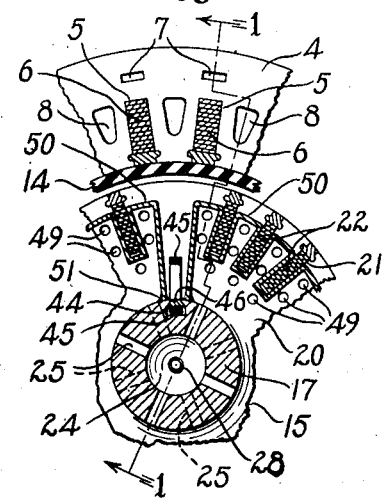
Inventor
Carl J. Fechheimer
By Arthur Finsky
Attorney Patented Aug. 7, 1945

2,381,122

UNITED STATES PATENT OFFICE 2,381,122

COOLING MEANS FOR DYNAMOELECTRIC MACHINES

Carl J. Fechheimer, Milwaukee, Wis.

Application April 27, 1944, Serial No. 532,950

12 Claims. (Cl. 171—252)

The invention relates to improvements in cooling means for dynamo-electric machines and is particularly applicable, though not restricted, to large high speed turbogenerators.

In my Patent 2,285,960, of June 9, 1942, I have disclosed a turbo-generator in which both the stator and rotor are cooled by a liquid, the liquid being conducted through ducts, while the entire rotor is enclosed in an air-filled chamber in which the air is cooled. Thus the exterior surface of the rotor and the end connections of the rotor winding are in heat conducting relation to the air in the chamber, while said air is cooled by cooling coils through which a cooling fluid is passed.

The present application discloses an improved construction of certain elements of the liquid cooling system disclosed in my former patent and further discloses means for applying hydrogen cooling to the exterior surface of the rotor and to the end connections of the rotor winding. While the advantages of operating the rotor in a hydrogen atmosphere were recognized and are implied in my former patent, a suitable construction for the purpose was not disclosed therein. By operating the rotor in an atmosphere of hydrogen instead of air the windage losses of the machine are greatly reduced. Furthermore, the rate of heat transfer from the ends of the rotor windings to the hydrogen cooling medium, and the rate of heat transfer from the latter to the cooler therefor are increased, as is also the heat conductivity of the insulation in the rotor slots between the rotor winding and the rotor teeth and rotor body by the substitution of hydrogen for air in the unavoidable interstices in the insulation of said winding. Thus the end connections of the rotor winding do not receive any substantial amount of heat conducted thereto from that part of the winding which is located in the slots and they are therefore kept relatively cooler.

While in my aforementioned patent the air which surrounds the rotor may be replaced by some other gas, the construction disclosed in said patent is not suitable for hydrogen. As pointed out before, the present invention discloses a structure which is particularly suited to the use of hydrogen as the atmosphere in which the rotor is rotated.

An object of the invention is to provide improved cooling of a dynamo-electric machine by a combination of liquid and hydrogen cooling means.

Another object is to provide a dynamoelectric machine having its stator and rotor cooled by a liquid passing therethrough, while the rotor operates in a hydrogen atmosphere and is partially cooled thereby.

Another object is to provide a combined system of liquid and hydrogen cooling for a machine to increase its capacity or conversely to reduce its physical dimensions for a given capacity.

Another object is to provide in a dynamo-electric machine a combined liquid and hydrogen cooling system which affords small physical dimensions of the machine for a given capacity.

Another object is to provide in a machine of the aforementioned character for reduction in the windage loss.

Another object is to provide an improved liquid circulating system for cooling the rotor of a dynamo-electric machine, which rotor may be either of unitary construction or be built up of longitudinally stacked plates or laminations.

Another object is to provide in a machine of the aforementioned character means for eliminating gases from a cooling liquid.

Another object is to provide means for preventing gas traps in a liquid cooling system for rotating machinery.

Another object is to provide means which eliminate the necessity of a liquidtight packing between the delivery conduit for the liquid and the shaft.

Another object is to prevent cavitation of the cooling liquid in its flow through the rotating part of a machine.

Other objects and advantages will hereinafter appear.

The accompanying drawing illustrates an embodiment of the invention, but it will be understood that the invention is capable of various modifications. In the drawing, Fig. 1 is a longitudinal section of one end of a machine incorporating the invention.

Fig. 2 is a longitudinal section of the bearing and shaft of the other end of said machine, while Fig. 3 is a transverse section along lines 3—3 of Fig. 1.

Referring to the drawing, Fig. 1 illustrates the right hand bearing end of an alternator of the type shown and described in detail in my aforementioned patent. The alternator has a stationary armature or stator and a rotating field or rotor, the latter being adapted to be coupled to a prime mover, such as a steam turbine, aligned with the alternator at the left end of the latter.

As shown in Figs. 1 and 3, the stator comprises a substantially ring shaped core 4, built up of sheets of magnetizable material in the usual manner. The core is provided at its inner periphery with suitable radial slots 5 in which the winding 6 is imbedded. Between the slots and its outer periphery the core is provided with a plurality of longitudinal ducts 7, while other longitudinal ducts 8 are provided in the teeth between adjacent slots 5. The latter ducts are arranged close to the slots 5 so as to be in good heat conducting relation to the coils of the winding 6 in order to readily absorb the heat resulting from losses in the embedded winding, and in the teeth, and also from such stray losses as are generated at the inner peripheral surface of the stator. The core 4 is supported in a substantially circular housing 9 provided with internal flanges 10 which abut the end of the core 4 and to which the core is clamped or otherwise fastened. The housing is supported on a conventional bed plate (not shown). The ducts 7 and 8 terminate in circular or ring shaped spaces 11 at each end of the housing. The space 11 is provided with an outlet conduit 12, and its end wall is formed by a flexible diaphragm 13.

Arranged inside of the stator ring and closely fitting its bore is a tube 14 of electrical insulating material. The tube is extended at both ends beyond the ends of the stator 4 to meet the radial diaphragm 13 to which the end of the tube 14 is fastened, to form therewith and with the housing 9, a fluid tight compartment for the stator ring 4 and the winding 6. While the drawing shows only one end of the housing the construction of the other end is substantially the same as has been more fully disclosed in my aforementioned patent.

The rotor of the machine comprises a substantially cylindrical body 15 which may be of a single forging, or which may, as shown in the drawing, be built up of a number of circular plates or discs 16. If built up of circular plates, a stub shaft 17 is provided at one end of the rotor, while a nearly similar shaft 18, shown in Fig. 2, is provided at the other end. The outer end of the shaft 18 is provided with a circular flange 19 by means of which it can be attached to the prime mover. The shaft 17 is further provided at its inner end with a circular flange 20 of the same diameter as the cylindrical body 15, thus forming part of said body. A similar flange (not shown) is provided at the inner end of the shaft 18, and the body 15 and shafts 17 and 18 are assembled into a unitary structure by bolts passing through the body 15 and the flanges of shafts 17 and 18 in a conventional manner. If desired the body and the shafts may be an integral structure. The rotor thus formed is provided with radial slots 21 in which the conductors 22 of its energizing winding are imbedded in the usual manner. The stub shaft 17 is provided with a central bore 23 which extends inwardly to a point inside of the flange 20.

The diameter of the inner end of the bore 23 is enlarged as by a taper, to form a pocket 24 which is provided with a number of outwardly extending smaller bores 25, shown as radial ducts in the drawing and terminating on the outer periphery of the shaft 17 at a location where it merges into the flange 20. While the bores 25 are shown arranged in the same transverse plane, they may be staggered longitudinally relative to each other. Due to centrifugal force exerted upon the liquid, the pocket 24 prevents the leakage of liquid through the space between the bore 23 and the conduit 26 toward the outer end of the bore 23. Mounted inside of and connected with the bore 23 is a conduit 26 through which cooling liquid flows toward the rotor body. The outer end of the conduit 26 is fastened by welding, or in any other suitable manner, to a flange 27 by means of which it is supported from a stationary part of the machine so that it is suspended freely within the bore 23. Mounted concentric with the conduit 26 is a second smaller conduit 28. The conduit 28 extends into the enlargement 24 of the bore 23, and its outer end passes through the wall of the outer conduit 26 and is provided with a valve 29, or a trap, or other device, the purpose of which will be explained hereinafter.

A circular disc or header 30 provided with a central bore 31 through which the shaft 17 passes has its outer end upturned as at 32 to form a rim with which it is bolted to the tube 14. A packing 33, providing an air-tight joint, is interposed between the rim 32 and the tube 14. The bore 31 and the shaft 17 are connected by a conventional gland seal 34 for preventing the leakage of hydrogen through the joint between the shaft and the header.

The machine is provided with a bearing pedestal 35, supporting a bearing bushing 36. The shaft has shrunk thereon a conventional sleeve 37 for rotatably supporting it in the bushing 36. A labyrinth packing or equivalent 38 is provided between the shaft 17 and the pedestal 35 to prevent the leakage of oil from the bearing 37 towards the outer end of the shaft.

While any suitable system of supplying exciting current for the rotor may be employed, the drawing shows an exciter mounted directly on the machine. Jointed to the bearing pedestal 35 is an exciter housing 39. The housing 39 carries the stationary poles 40 of the exciter, while the armature 41 and the cooperating commutator 42 of the exciter are mounted in any conventional manner on the shaft 17 to rotate therewith. There is also mounted on the shaft 17 a pair of collector-rings 43 by means of which the current from the exciter is conducted to the rotor winding 22. The collector-rings are connected to the commutator 42 in a conventional manner (not shown). The shaft has milled in its surface a radial slot 44 which extends from the collector-rings along the shaft to the flange 20 and in which two conductors 45 are imbedded leading from the collector-rings 43 to the winding 22. After insertion of the insulated conductors which are preferably of rectangular cross section, the slot is closed by a conventional wedge 46. The inner end of the slot 44 terminates at a point where the shaft 17 merges into the flange 20 as is clearly indicated in the drawing.

The outer end of the housing 39 is closed by a circular flange 47 provided with a central bore 48 of sufficient size to clear the shaft 17, while the flange 27 which supports the conduit 26 is bolted to said flange 47 to provide a firm support for said conduit.

The rotor is provided with axial conduits 49 which pass through the entire length of the rotor body including the flanges of the shafts 17 and 18, as shown in Figs. 1 and 3. If the rotor is a simple forging, said conduits are merely holes drilled through the rotor body, but if the rotor is built up of circular plates or discs as shown in Fig. 1, the conduits are formed by registering holes in the discs and they may be lined with thin metal tubings of high heat conductivity to prevent leakage of cooling fluid between the plates. The ends of such tubings are welded or otherwise joined in a liquid tight manner to the outer surface of the shaft flanges 20 at both ends of the rotor.

To conduct the liquid which is passed into the rotor through the tube 26, from the ducts 25 in the chamber 24 to the conduits 49, a connection is made by means of a substantially circular sheet metal casing 50 which is welded or otherwise joined to the shaft 17 as shown at 51, and which is provided with substantially radial recesses passing around the ends of the slots 21 so as to clear the end connections 52 of the winding 22. The casing 50 is also welded to the flange 20 so as to form with the shaft a liquid tight space 53.

A similar construction of ducts for the cooling liquid (not shown) is arranged on the shaft 18 at the other end of the rotor. The details of such construction are obvious from the foregoing description, while additional details of the construction of the discharge end of the liquid cooling system will now be described.

The stub shaft 18 at the end of the rotor opposite to that of shaft 17 is further provided with a bore 54, the outer end of which is closed by a disc 55. The shaft 18 and the left hand disc or header 56, corresponding to the disc 30 aforedescribed are provided with a gland seal 57 to form a substantially leakless joint. This seal is similar to the seal 34 at the right hand end of the machine. Beyond the seal 57 the shaft 18 is provided with a sleeve 58 for journalling the shaft in a bearing 59 supported by the left hand bearing pedestal 60, which is attached to the machine bed plate.

The bore 54 of the shaft 18 is provided with substantially radial ducts 61 passing through the wall of the shaft at a point between the bearing 59 and the coupling flange 19. The outer ends of each duct is partially closed by a disc 62 provided with an orifice 63 of reduced cross section. The orifice is so proportioned as to secure a loss of head in the liquid stream, by creating a high velocity head of the liquid, the energy of which is wasted upon discharge from the orifice. A labyrinth packing 64, similar to the packing 38, is interposed between the pedestal 60 and the shaft 18 between the orifices 63 and the flange 19 to prevent oil leakage from the bearing 59 toward the coupling flange 19.

The cooling fluid is passed to the rotor from a reservoir from which it flows through the tube 26 to the pocket 24, where upon rotation the centrifugal force produces a pressure head on the liquid which forces it through the conduits 25 and the space 53 from and through the conduits 49 to the other end of the rotor, through a similar space 53 and ducts 25 at the other end of the rotor to the bore 54 into the radial ducts 61 and through the orifices 63 into a sump (not shown) which may be located in the bearing pedestal 60 and from there it is returned to the original storage container. It is of course understood that the liquid flow through the system is started prior to starting the rotation of the rotor in order to prevent the entrapment of gas in the rotor passages.

As the centrifugal force exerted upon the liquid in the radial conduits 25 and the casing 50 creates a suction in the pocket 24 of the admission bore, air may be sucked in from the outside through the space between the admission bore 23 and the conduit 26 and due to the great difference in the density of the liquid and the air, the latter collects about the central axis of the pocket 24. Air or gas may also be entrapped in the cooling liquid which is supplied through the conduit 26 to the machine and this also will be segregated from the liquid in the manner aforedescribed. The segregated air or gas may be drawn off through the conduit 28, by opening of the valve 29 which permits it to escape. Other means, such as a U-tube trap containing a liquid through which the escaping gas bubbles may be substituted for the valve 29. To cause the entrapped gas in the pocket 24 to escape through the conduit 28, the pressure of the liquid as it emerges from conduit 26 is maintained above atmospheric pressure by a pump or the equivalent thereof in the liquid supply circuit.

It will be obvious that the liquid in its passage from the conduit 26 to conduits 49 is subjected to a centrifugal force which produces a suction head on the entering liquid, while in its return passage from the bore 49 to the bore 54 of the shaft 18 the liquid is subjected to another cenrtifugal force which is in opposition to the suction head aforementioned, so that the two cancel each other. However, in its passage through the ducts 61 and the orifice 63 the liquid is again subjected to a centrifugal force which produces an additional suction head. The result is a net suction head upon the liquid in its passage through the machine. The orifices 63 are so proportioned that the net suction head produced in the bores 61 is partially consumed by the velocity head upon discharge from said orifices, the orifices 63 being so proportioned that the resultant suction head on the liquid in the bore 61 is greater than zero absolute pressure, to avoid caviation, but the suction is sufficient to cause an ample flow of cooling liquid through the rotor. Obviously, the radial ducts themselves may be so proportioned that the same result is achieved as with the described combination of relative large ducts and restricted orifices. It is assumed that the pressure on the liquid where it enters the conduit 26 is slightly above atmospheric pressure.

In order to further insure against entrapped gas or air in the liquid, a means may be provided to remove such air prior to the delivery of the liquid to the conduit 26. These means may consist of a separate tank, a centrifuge or equivalent means and may be located in series with a circulating pump for the liquid and a heat exchanger for removing heat from the liquid. The arrangement in any event is such that the liquid as it enters the conduit 26 is slightly above atmospheric pressure. In most cases where oil is used as the cooling liquid, the oil for the bearings will be circulated separately from the oil for cooling the rotor of the machine, but should it be deemed desirable to combine the two oil flows, the same pump and heat exchanger may serve both purposes.

By locating the bores 61 between the bearing 59 and the coupling flange 19 the maximum stresses on the shaft 18 are greatly reduced. If these bores were located at the other side of the bearing 59 where the shaft is subjected to both bending and torsional stresses, the increase of the stresses on the shaft due to the reduction of its cross section by these bores would be much more than it is by locating them as indicated, because at the latter location the shaft is subjected substantially only to torsional stresses.

It will be seen that the construction provides for a space around the rotor surface between the tube 14, the rotor, including the casing 50, the end flanges 30 and 56, and the shafts 17 and 18 which space is filled with hydrogen so that the outside peripheral area of the rotor, the winding 22 and particularly the coil ends 52 are subjected to the cooling effect of said hydrogen. The hydrogen in turn may be cooled by finned coils 65 through which water or another liquid is passed to absorb heat from the hydrogen, as has been more fully disclosed in my aforementioned patent where the air which surrounds the rotor and the rotor winding is cooled in a similar manner.

What I claim as new and desire to secure by Letters Patent is:

1. The combination with a dynamoelectric machine having a stator and a rotor with an air gap therebetween, said rotor being provided with a plurality of longitudinal ducts for a cooling liquid, a shaft extension at each of its ends, a concentric admission bore extending into one and a concentric discharge bore extending into the other of said shaft extensions, of a casing arranged at each end of the rotor and each providing a fluidtight chamber, connecting ducts in each of said shaft extensions to afford a hydraulic connection between the respective chamber and the inner ends of the corresponding bore, means associated with said discharge bore and effective upon rotation of the rotor to produce a given resultant pressure upon a cooling liquid in said discharge bore, gas exhaust means cooperating with said admission bore and adapted to exhaust entrapped gas from a liquid in said bore, a stationary insulating tube concentric with said rotor located in said air gap and provided at each of its ends with a header, and a gland seal interposed between the respective header and shaft extension to form with said tube a housing adapted to confine a hydrogen atmosphere about said rotor.

2. The combination with the rotor of a dynamoelectric machine, said rotor being provided with a plurality of longitudinal ducts for a cooling liquid, a shaft extension at each of its ends, a concentric admission bore extending into one and a concentric discharge bore extending into the other of said shaft extensions, of a casing arranged at each end of the rotor and each providing a fluidtight chamber, connecting ducts in each of said shaft extensions to afford a hydraulic connection between the respective chamber and the inner end of the corresponding bore, the inner end of said admission bore being radially enlarged to form a pocket, means associated with said discharge bore and effective upon rotation of the rotor to produce a differential pressure upon a cooling liquid passing therethrough, and an air exhaust conduit having its entrance opening in the axis of said pocket and adapted to permit escape of accumulated air therefrom.

3. The combination with the rotor of a dynamoelectric machine, said rotor having a plurality of plates of magnetic material in longitudinal alignment to form a rotor body, a shaft extension at each end of said body, a concentric admission bore extending into one, a concentric discharge bore extending into the other of said shaft extensions, and a plurality of longitudinal ducts passing through said body, of a thin tube fitted closely into each of said longitudinal ducts, a casing arranged at each end of the rotor body and each providing a fluidtight chamber in hydraulic connection with said tubes, connecting ducts in each of said shaft extensions to afford a hydraulic connection between the respective chamber and the inner end of the corresponding bore, a radial enlargement forming a pocket at the inner end of said admission bore, means associated with said discharge bore and effective upon rotation of the rotor to produce a differential pressure upon a cooling liquid passing therethrough, and an air exhaust conduit having its entrance opening in the center of said pocket and adapted to permit escape of accumulated air therefrom.

4. The combination with the rotor of a dynamoelectric machine, said rotor having a plurality of longitudinal ducts for a cooling liquid, a shaft extension at each of its ends, a concentric admission bore extending into one and a concentric discharge bore extending into the other of said shaft extensions, the inner end of both bores and the outer end of the discharge bore being closed and a stationary admission conduit communicating with the inner end of said admission bore, of a casing arranged at each end of the rotor and each providing a fluidtight chamber, connecting ducts in each of said shaft extensions to afford a hydraulic connection between the respective chamber and the inner ends of the corresponding bore, the inner end of said admission bore being radially enlarged to form a pocket, and a discharge orifice located between the ends of said discharge bore and proportioned to produce upon rotation of the rotor a differential pressure upon a cooling liquid passing therethrough and to consume a portion of the energy imparted to said liquid by the centrifugal force exerted thereon.

5. The combination with the rotor of a dynamoelectric machine, said rotor having a plurality of longitudinal ducts for a cooling liquid, a shaft extension at each of its ends, a concentric admission bore extending into one and a concentric discharge bore extending into the other of said shaft extensions, the inner end of both bores and the outer end of the discharge bore being closed and a stationary admission conduit communicating with the inner end of said admission bore, of a casing arranged at each end of the rotor and each providing a fluidtight chamber, connecting ducts in each of said shaft extensions to afford a hydraulic connection between the respective chamber and the inner end of the corresponding bore, the inner end of said admission bore being radially enlargd to form a pocket, and a discharge duct having a restriction therein and located between the ends of said discharge bore and proportioned to produce upon rotation of said rotor a pressure upon a cooling liquid in said discharge bore which is below the pressure of the ambient air.

6. The combination with the rotor of a dynamoelectric machine, said rotor having a plurality of longitudinal ducts for a cooling liquid, a shaft extension at each of its ends, a concentric admission bore extending into one and a concentric discharge bore extending into the other of said shaft extensions, the inner end of both bores and the outer end of the discharge bore being closed, of a casing arranged at each end of the rotor and each providing a fluidtight chamber, connecting ducts in each of said shaft extensions to afford a hydraulic connection between the respective chamber and the inner ends of the corresponding bore, the inner end of said admission bore being radially enlarged to form a pocket, and a stationary supply conduit extending into said pocket and adapted to supply liquid under pressure to said pocket.

7. In a system for passing a cooling liquid through the rotor of a dynamoelectric machine, the combination with a rotor provided with a plurality of longitudinal ducts for a cooling liquid, a shaft extension at each end of the rotor, a concentric admission bore extending into one and a concentric discharge bore extending into the other of said shaft extensions, of a casing arranged at each end of the rotor and each providing a fluidtight chamber, connecting ducts in each of said shaft extensions to afford a hydraulic connection between the respective chamber and the inner end of the corresponding bore, the inner end of said admission bore being radially enlarged to form a pocket, means associated with said discharge bore and effective upon rotation of the rotor to produce in a cooling liquid passing through the rotor a difference between the liquid pressure in said inlet bore and the liquid pressure in said discharge bore, and an air exhaust conduit having its entrance opening in the axis of said pocket and adapted to permit escape of accumulated air therefrom.

8. The combination with the rotor of a dynamoelectric machine, said rotor having a plurality of longitudinal ducts for a cooling liquid, a shaft extension at each of its ends, a concentric admission bore extending into one and a concentric discharge bore extending into the other of said shaft extensions, the inner ends of both bores and the outer end of the discharge bore being closed, of a casing arranged at each end of the rotor and each providing a fluidtight chamber, connecting ducts in each of said shaft extensions to afford a hydraulic connection between the respective chamber and the inner end of the corresponding bore, the inner end of said admission bore being radially enlarged to form a pocket, and a restricted orifice located between the ends of said discharge bore and arranged and proportioned to throttle the flow of liquid therethrough and to absorb substantially that portion of the generated pressure produced upon rotation of said rotor which is in excess of atmospheric pressure, but to preserve a sufficient head to afford a given amount of flow of cooling liquid through the plurality of longitudinal ducts in the rotor.

9. The combination with the rotor of a dynamoelectric machine, said rotor having a plurality of longitudinal slots, a rotor winding, a plurality of longitudinal ducts for a cooling liquid adjacent to said slots, a shaft extension at each of its ends, a concentric admission bore extending into one and a concentric discharge bore extending into the other of said shaft extensions, the inner ends of said bores being closed, of a casing arranged at each end of the rotor and each providing a fluidtight chamber, said casing having in its outer periphery recesses in alignment with said rotor slots to provide space for the part of the rotor winding extending beyond the ends of the rotor slots on the outside of said fluidtight chamber, and connecting ducts in each of said shaft extensions to afford a hydraulic connection between the respective chamber and the inner end of the corresponding bore.

10. In a cooling system, the combination with a rotor of a dynamoelectric machine, said rotor having a shaft extension at each end, a plurality of longitudinal ducts for a cooling liquid, a concentric admission bore extending into one and a concentric discharge bore extending into the other of said shaft extensions and each hydraulically connected with the respective end of said longitudinal ducts, of a radial enlargement of the inner end of said admission bore to form a pocket, and a tube extending into the axis of said pocket to afford by centrifugal action upon rotation of said rotor separation of air which may be entrapped in a liquid flowing through said admission bore.

11. In a cooling system, the combination with a rotor of a dynamoelectric machine, said rotor having a shaft extension at each end, a plurality of longitudinal ducts for a cooling liquid, a concentric admission bore extending into one and a concentric discharge bore extending into the other of said shaft extensions and each hydraulically connected with the respective end of said longitudinal ducts, of a radial enlargement of the inner end of said admission bore to form a pocket, and an air exhaust conduit having its entrance opening in the central axis of said pocket and adapted to permit escape of accumulated air therefrom.

12. In a cooling system, the combination with a rotor of a dynamoelectric machine, said rotor having a shaft extension at each end, a plurality of longitudinal ducts for a cooling liquid, a concentric admission bore extending into one and a concentric discharge bore extending into the other of said shaft extensions and each hydraulically connected with the respective end of said longitudinal ducts, of a radial enlargement of the inner end of said admission bore to form a pocket and a supply conduit concentric with said admission bore and opening into said pocket.

CARL J. FECHHEIMER.